(12) United States Patent
Bird

(10) Patent No.: US 6,483,856 B1
(45) Date of Patent: Nov. 19, 2002

(54) GPS SYNCHRONIZED DATA COMMUNICATIONS LINK

(75) Inventor: David G. Bird, Greensboro, NC (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 09/124,586

(22) Filed: Jul. 29, 1998

(51) Int. Cl.[7] .................................................. H04J 3/06
(52) U.S. Cl. ...................... 370/503; 375/145; 375/149; 342/357.12; 701/213
(58) Field of Search ................................. 370/503, 507, 370/508, 509, 510, 511, 512, 513, 514, 518, 519, 520, 521, 516; 342/357.06, 357.08, 357.12; 375/356, 365, 366, 367, 368, 145, 149; 701/213

(56) References Cited

U.S. PATENT DOCUMENTS

| | | | | |
|---|---|---|---|---|
| 5,481,258 A | * | 1/1996 | Fawcett et al. ............. | 340/7.26 |
| 5,506,863 A | * | 4/1996 | Meidan et al. .............. | 375/134 |
| 5,663,715 A | * | 9/1997 | Godoria .................... | 340/825.2 |
| 5,966,658 A | * | 10/1999 | Kennedy, III et al. ...... | 455/426 |
| 5,970,400 A | * | 10/1999 | Dwyer ....................... | 455/254 |
| 5,982,324 A | * | 11/1999 | Watters et al. ........... | 342/357.06 |
| 6,016,322 A | * | 1/2000 | Goldman ..................... | 370/508 |
| 6,091,786 A | * | 7/2000 | Chen et al. ................. | 375/326 |

* cited by examiner

Primary Examiner—Melvin Marcelo
Assistant Examiner—Inder Pal Mehra
(74) Attorney, Agent, or Firm—David R. Gildea

(57) ABSTRACT

A communication system using GPS-based time for synchronizing communication data packets and symbols. The communication system includes a transmit apparatus for transmitting and a receive apparatus for receiving a communication data signal. The transmit apparatus includes a transmit station GPS receiver for providing GPS-based time, a transmit framer for using the GPS-based time for framing packets of communication data symbols, and a transmit symbol timer for synchronizing the communication data symbols to the GPS-based time. The receive apparatus includes a GPS receiver for providing the GPS-based time, a receive framer for using the GPS-based time for receiving the packets of the communication data signal, and a receive symbol timer for synchronizing the reception of the communication data symbols to the GPS-based time. Either the transmit apparatus includes a propagation advance calculator or the receive apparatus includes a propagation delay calculator in order to compensate for the propagation delay of the communication data signal between the transmit apparatus and the receive apparatus.

35 Claims, 3 Drawing Sheets

GPS SYNCHRONIZED DATA COMMUNICATIONS LINK

BACKGROUND OF THE INVENTION

1. Field of the Invention

The invention relates generally to symbol clock recovery for a radio communication system and more particularly to a radio system using a global position system (GPS)-based time for synchronizing the transmission and reception of communication symbols.

2. Description of the Prior Art

Communication links commonly communicate with discrete data packets that are separated in time. Such communication links have several benefits as compared to links using continuous communication, however, several issues must be resolved in order for a packet communication link to operate. A first issue is that the receiver must synchronize itself to the times-of-arrival of symbols within the data packet in order to sample the symbols at the correct times. In a conventional packet communication link in order to resolve this issue, a transmitter prepends preamble symbols to the beginning of each data packet. A receiver receives the preamble symbols with a phase lock loop for recovering a symbol clock that is then used for detecting the symbols at the correct times. However, the number of symbols that must be received before achieving symbol synchronization varies depending upon the initial frequency and phase offsets in the symbol clock recovery phase lock loop and the signal-to-noise ratio in a particular application. Therefore, a second issue is that the receiver must synchronize itself to the start of a payload portion of the data packet without knowing how many of the preamble symbols remain when the symbol clock has been recovered. Conventionally, in order to resolve this issue, the transmitter inserts a pre-determined pattern of frame synchronization symbols at the end of the preamble. The receiver uses the frame synchronization symbols for synchronizing itself to the beginning of the payload data symbols. Unfortunately, the preamble and the frame synchronization pattern represent overhead that use up time but do not communicate useful payload information. This overhead is especially disadvantageous when the packets are short. There is a need for a packet communication system where the time overhead of a preamble and a frame synchronization pattern are eliminated.

SUMMARY OF THE INVENTION

It is therefore an object of the present invention to provide a communication transmit apparatus including a global positioning system (GPS) receiver for transmitting communication data symbols synchronized to GPS-based time.

Another object of the present invention is to provide a communication receive apparatus including a GPS receiver for using GPS-based time for synchronizing to the communication data symbols.

Briefly, in a preferred embodiment, a communication system of the present invention includes a transmit apparatus for transmitting a communication signal having data symbols synchronized to a pre-determined GPS-based time and a receive apparatus for using the pre-determined GPS-based time for receiving the communication signal and synchronizing to the data symbols. The transmit apparatus includes a transmit station GPS receiver for providing a GPS-based time that is current, a transmit framer for beginning the transmission of a packet of data symbols when the current GPS-based time reaches the pre-determined GPS-based time, and a transmit symbol timer for synchronizing the transmission of data symbols to time ticks of GPS-based time. The receive apparatus includes a GPS receiver for providing the current GPS-based time, a receive framer for receiving the data symbol packet when the current GPS-base time equals the pre-determined time, and a receive symbol timer for using the GPS-based time ticks for aligning to the incoming data symbols. Either the transmit apparatus includes a propagation advance calculator or the receive apparatus includes a propagation delay calculator in order to compensate for the propagation delay of the communication signal between the transmit apparatus and the receive apparatus.

An advantage of a communication system of the present invention is that time overhead for transmitting and receiving preamble and frame synchronization patterns is eliminated.

Another advantage of a communication system of the present invention is that a symbol clock recovery circuit and a frame detection circuit are not required for receiving a communication signal.

These and other objects and advantages of the present invention will no doubt become obvious to those of ordinary skill in the art after having read the following detailed description of the preferred embodiments which are illustrated in the various figures.

DETAILED DESCRIPTION OF THE PREFERRED EMBODIMENTS

Figure 1:
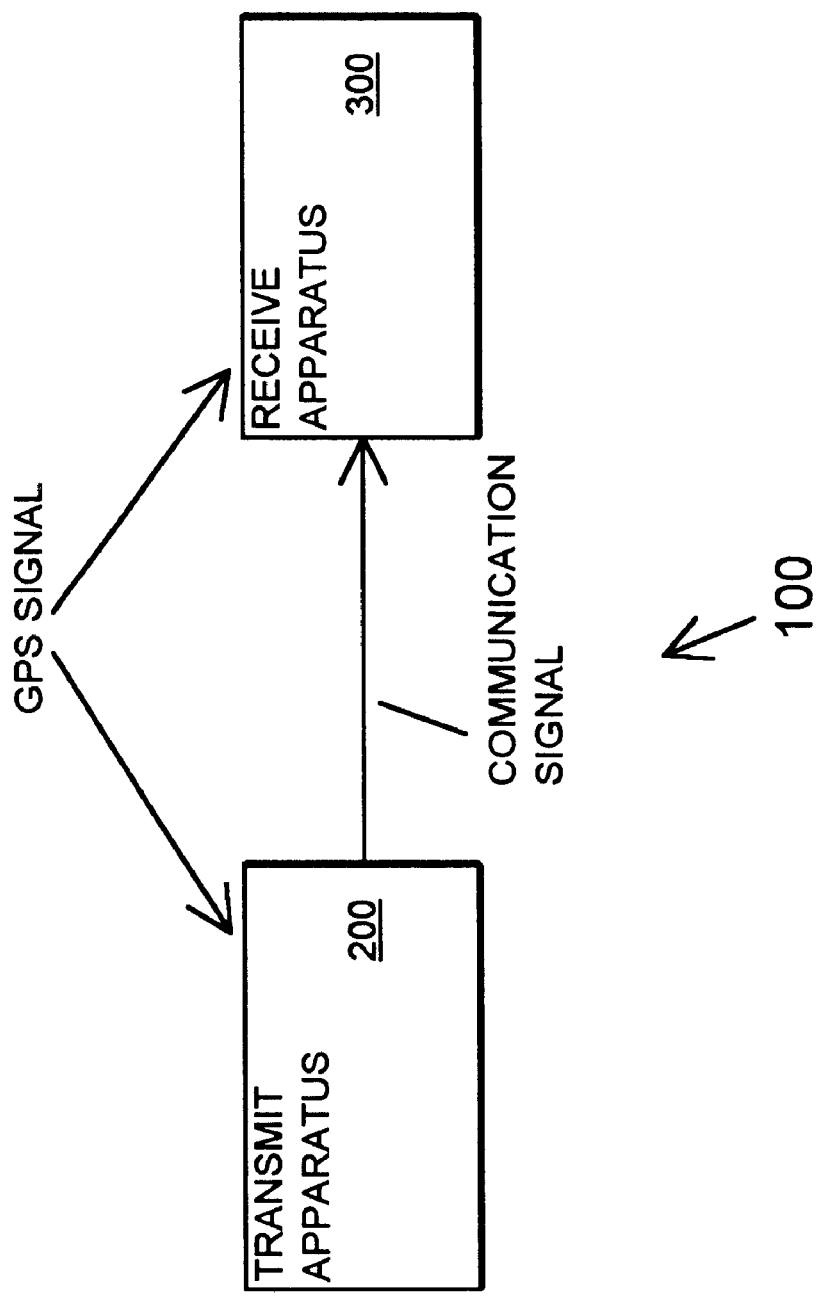
FIG. 1 is a block diagram of a communication system including a transmit apparatus of the present invention and a receive apparatus of the present invention.

FIG. 1 is a block diagram of a communication system of the present invention referred to by the general reference number 100. The system 100 includes a transmit apparatus 200 and a receive apparatus 300. The transmit apparatus 200 receives a global positioning system (GPS) signal from one or more GPS satellites and/or pseudolites and transmits a communication signal having communication data symbols starting at a pre-determined GPS-based time and synchronized by a transmit symbol clock signal having a timing that is synchronized to GPS-based time ticks. The GPS signal includes information that is derived from atomic clocks from which a current GPS-based time may be determined to within one-hundred nanoseconds or better anywhere within range of the GPS signal including everywhere on the surface of the Earth. The receive apparatus 300 receives the GPS signal and uses the same pre-determined GPS-based time for receiving the communication signal and generating a receive symbol clock signal that uses GPS-based time ticks for synchronizing to the communication data symbols. The transmit and receive symbol clock signal rate are the baud rate that is specified as a parameter of the system 100. In order to compensate for propagation time between the transmit apparatus 200 and the receive apparatus 300 either the transmit apparatus 200 is constructed and programmed to transmit the communication data symbols in advance of the pre-determined GPS-based time or the receive apparatus 300 is constructed and programmed to receive the communication data symbols with a delay from the pre-determined GPS-based time.

Figure 2:
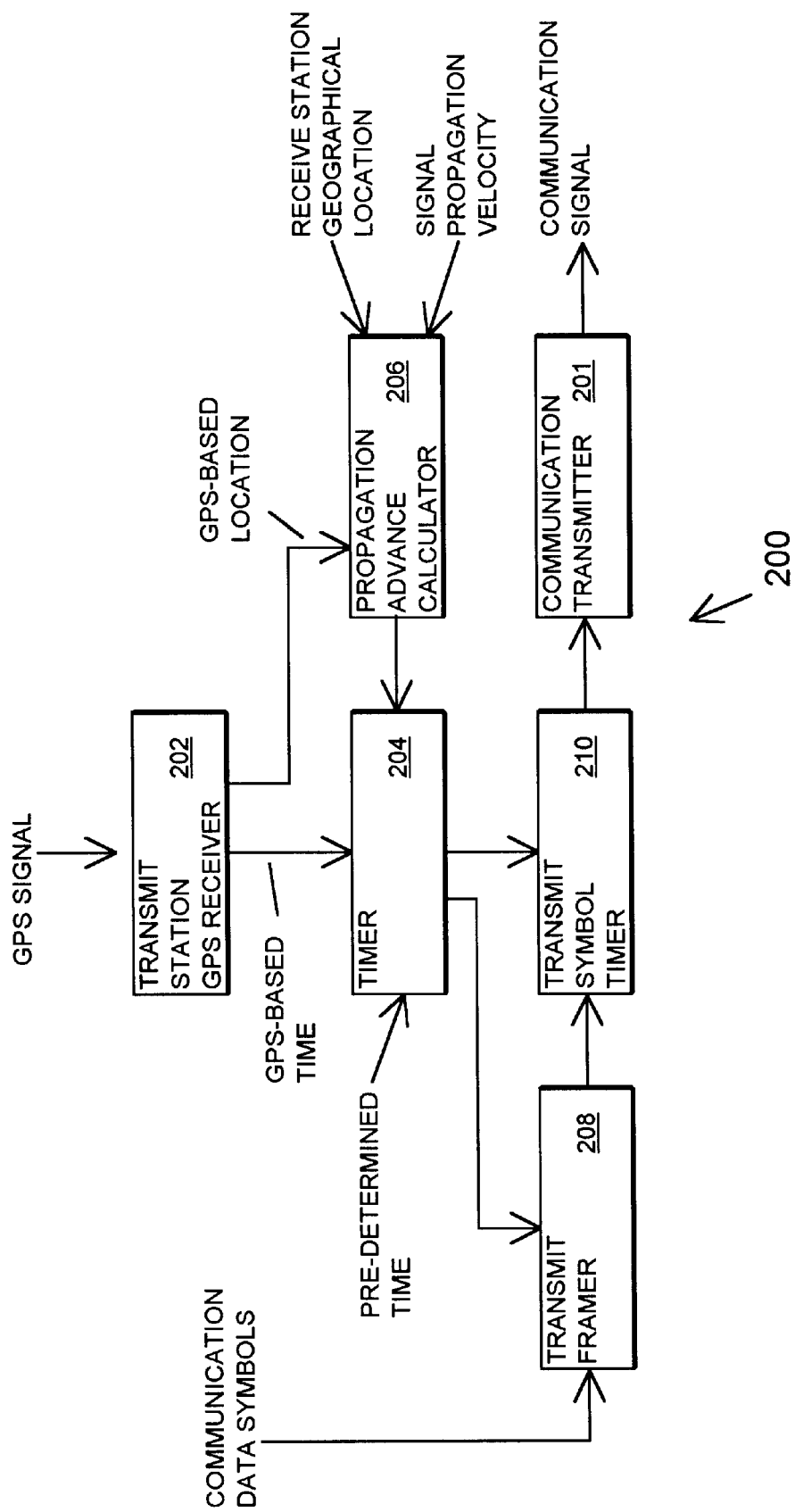
FIG. 2 is a block diagram of the transmit apparatus of FIG. 1.

FIG. 2 is a block diagram of the transmit apparatus 200 of the present invention. The transmit apparatus 200 includes a communication transmitter 201 for transmitting the communication signal and a transmit station GPS receiver 202 for receiving the GPS signal. The transmit station GPS receiver 202 provides the GPS-based time as a GPS-based time tick signal, such as a pulse train having a one microsecond time period between individual pulses, and GPS-based time data to a timer 204. The GPS-based time data is issued at periodic intervals for informing the timer 204 that the next time tick represents a certain time, such as 00 hours, 00 minutes, 00.000 seconds. Information for the GPS day and the GPS week may be included. The timer 204 is programmed with or receives information for the pre-determined GPS-based time at which the communication signal is to be transmitted. In a preferred embodiment, the pre-determined GPS-based time is repetitive at a time interval such as once per hour.

The transmit station GPS receiver 202 provides information for a transmit station GPS-based geographical location of the transmit apparatus 200 to an optional propagation advance calculator 206. The propagation advance calculator 206 uses the transmit station.location; information for a receive station geographical location that is stored, entered by a user, or received in a signal for the receive apparatus 300 (FIG. 1); and a propagation velocity for the communication signal for calculating a propagation advance time for.compensating for the propagation delay between the transmit apparatus 200 and the receive apparatus 300 (FIG. 1) and passes information for the propagation advance time to the timer 204. The timer 204 adds the optional propagation advance time to the GPS-based time data as updated by the GPS-based time tick signal for providing-an advance frame clock time. When the advance frame clock time (or the current GPS-based time when the optional propagation advance calculator 206 is not used) reaches the pre-determined GPS-based time, the timer 204 passes a framing signal to a transmit framer 208.

The timer 204 synchronously converts the repetition rate of the GPS-based time tick signal to the repetition rate of the symbol clock signal that is specified for the system 100. Such synchronous conversion may be implemented with combinations of frequency dividers, phase lock loops, and delay circuits in manners that are well-known to digital design engineers. The initial cycle of the symbol clock signal follows the framing signal by one-half the symbol clock signal period and thereafter subsequent cycles follow at intervals of one symbol clock signal period.

The transmit framer 208 receives communications data symbols from a memory; a buffer, or a serial interface device and uses the framing signal for synchronously issuing the communication data signal as a packet or burst. A transmit symbol timer 210 receives the burst and uses the symbol clock signal from the timer 204 for clocking the data symbols to the communication transmitter 201. The communication transmitter 201 transmits the communication signal including the communication data symbols as a radio signal.

Figure 3:
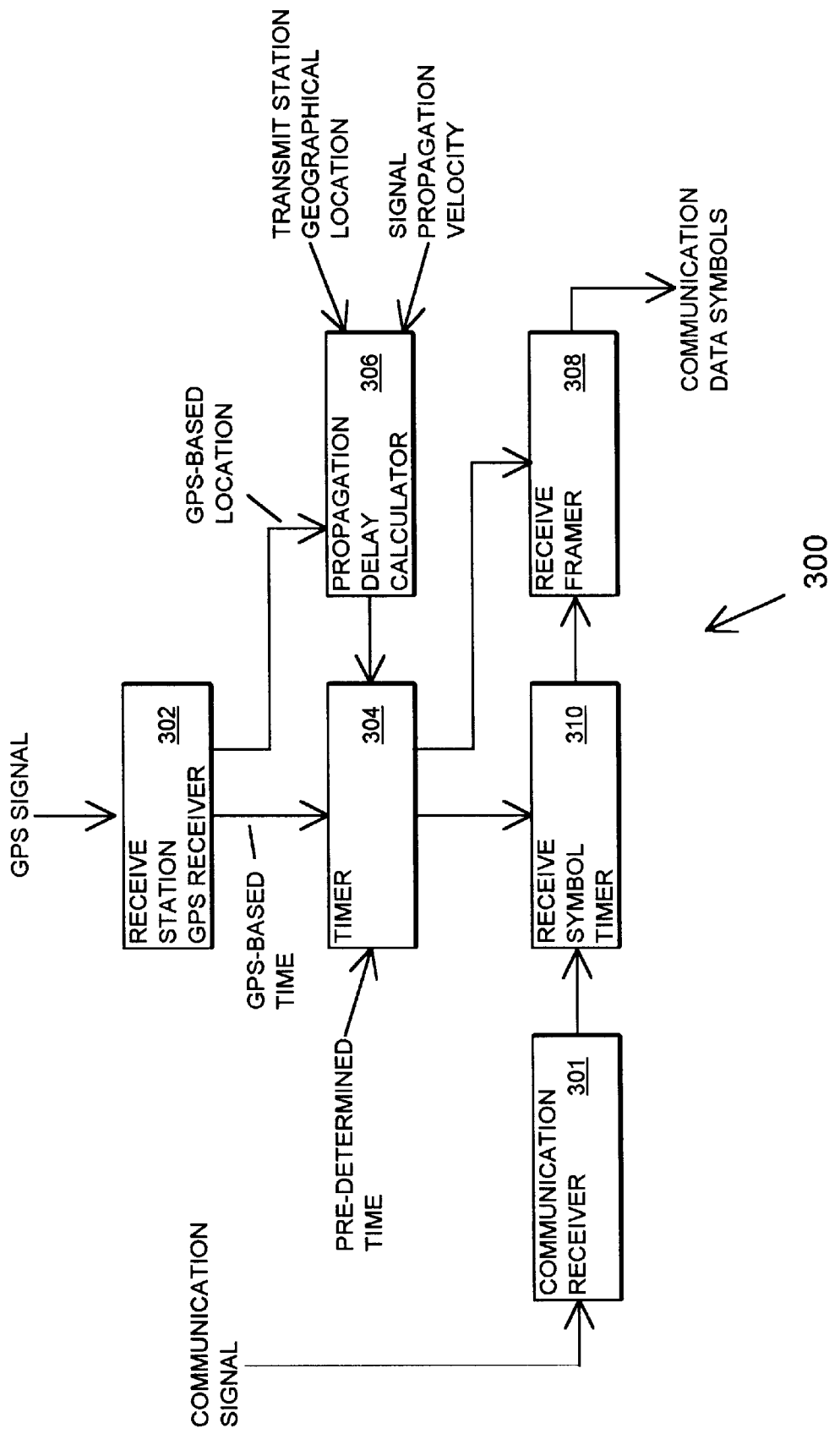
FIG. 3 is a block diagram of the receive apparatus of FIG. 1.

FIG. 3 is a block diagram of the receive apparatus 300 of the present invention. The receive apparatus 300 includes a communication receiver 301 for receiving the communication signal including the communication data symbols from the transmit apparatus 200 (FIG. 1) and a receive station GPS receiver 302 for receiving the GPS signal from preferably several GPS satellites and/or GPS pseudolites. The receive station GPS receiver 302 provides the GPS-based time as a GPS-based time tick signal, such as a pulse train having a one microsecond time period between individual pulses, and GPS-based time data to a timer 304. As described above, the GPS-based time data is issued at periodic intervals for informing the timer 304 that the next time tick represents a certain time, such as 00 hours, 00 minutes, 00.000 seconds. Information for the GPS day and the GPS week may be included. The timer 304 is programmed with or receives information for the pre-determined GPS-based time at which the communication signal is to be received. The pre-determined GPS-based time in the receive apparatus 300 is the same as the pre-determined GPS-based time in the transmit apparatus 200 (FIG. 1).

The receive station GPS receiver 302 provides information for a receive station GPS-based geographical location of the receive apparatus 300 to an optional propagation delay calculator 306. The propagation delay calculator 306 uses the receive station location; information for a transmit station geographical location that is stored, entered by a user, or received in a signal for the transmit apparatus 200 (FIG. 1); and a propagation velocity for the communication signal for calculating a propagation delay time for compensating for the propagation delay between the transmit apparatus 200 (FIG. 1) and the receive apparatus 300 and passes information for the propagation delay time to the timer 304.

The timer 304 subtracts the propagation-delay time from the current GPS-based time data as updated by the GPS-based time tick signal for providing a delayed frame clock time. When the delayed frame clock time (or the current GPS-based time when the optional propagation delay calculator 306 is not used) reaches the pre-determined GPS-based time, the timer 304 passes a framing signal to a receive framer 308.

The timer 304 synchronously converts the repetition rate of the GPS-based time tick signal to the repetition rate of symbol clock signal that is specified for the system 100. Such synchronous conversion may be implemented with combinations of frequency dividers, phase lock loops, and delay circuits in manners that are well-known to digital design engineers. The initial cycle of the symbol clock signal follows the framing signal by one-half the symbol clock signal period and thereafter subsequent cycles follow at intervals of one symbol clock signal period. A receive symbol timer 310 receives the communication data signal as a burst or packet from the communication receiver 301 and synchronizes the communication data symbols to the symbol clock signal received from the timer 304. The receive framer 308 receives the communication data symbols from the receive symbol timer 310, uses the framing signal for framing the start of the packet, and passes the packet of the communication data symbols to a memory, a buffer, or a serial interface device.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A receive apparatus, comprising:
   a communication receiver for receiving a communication signal having communication data symbols timed according to global positioning system (GPS)-based time;

a receive station GPS receiver for determining said GPS-based time; and a receive symbol timer for using a symbol clock signal derived from said GPS-based time for synchronizing to said communication data symbols.

2. A receive apparatus, comprising:

a communication receiver for receiving a communication signal having a data frame transmitted with timing according to global positioning system (GPS)-based time;

a receive station GPS receiver for determining said GPS-based time; and a receive frame timer for using said GPS-based time for synchronizing to said data frame.

3. The receive apparatus of claim 1, further comprising:

a propagation delay calculator for providing a propagation delay time between the receive apparatus and a transmit apparatus, said transmit apparatus for transmitting said communication signal, and using said GPS-based time with said propagation delay time for synchronizing to said communication data symbols.

4. The receive apparatus of claim 3, wherein:

the receive station GPS receiver is further for determining a receive station GPS-based geographical location for the receive apparatus; and the propagation delay calculator is further for calculating said propagation delay time from said receive station GPS-based location and a geographical location of said transmit apparatus.

5. The receive apparatus of claim 1, wherein:

said communication signal is received from a transmit apparatus, said transmit apparatus including a transmit station GPS receiver for determining said GPS-based time and a transmit symbol timer for synchronizing said communication data symbols to said GPS-based time.

6. A transmit apparatus, comprising:

a transmit station global positioning system (GPS) receiver for determining GPS-based time;

a transmit symbol timer for synchronizing communication data symbols to said GPS-based time; and a communication transmitter for transmitting a communication signal having said communication data symbols.

7. A transmit apparatus, comprising:

a transmit station global positioning system (GPS) receiver for determining GPS-based time;

a transmit frame timer for using said GPS-based time for synchronizing a data frame, said data frame for framing a packet of said communication data symbols; and a communication transmitter for transmitting a communication signal having said data frame.

8. The transmit apparatus of claim 6, wherein:

a propagation advance calculator for providing a propagation advance time between the transmit apparatus and a receive apparatus for receiving said communication signal and for using said GPS-based time with said propagation advance time for synchronizing said communication data symbols.

9. The transmit apparatus of claim 8, wherein:

the transmit station GPS receiver is further for determining a transmit station GPS-based geographical location for the transmit apparatus; and the propagation advance calculator is further for calculating said propagation advance time from said transmit station GPS-based location and a geographical location of said receive apparatus.

10. The transmit apparatus of claim 6, wherein:

said communication signal is transmitted to a receive apparatus, said receive apparatus including a receive station GPS receiver for determining said GPS-based time and a receive symbol timer for synchronizing said communication data symbols with said GPS-based time.

11. A method for receiving a communication signal in a receive apparatus, comprising steps of:

receiving a communication signal having communication data symbols timed according to global positioning system (GPS)-based time;

determining said GPS-based time with a receive station GPS receiver; and using said GPS-based time for generating a symbol clock signal for synchronizing to said communication data symbols.

12. A method for receiving a communication signal in a receive apparatus, comprising steps of:

receiving a communication signal having a packet transmitted with timing according to global positioning system (GPS)-based time;

determining said GPS-based time with a receive station GPS receiver; and using said GPS-based time for synchronizing to said packet.

13. The method of claim 11, further comprising steps of:

providing a signal propagation delay time between the receive apparatus and a transmit apparatus for transmitting said communication signal; and using said propagation delay time with said GPS-based time for synchronizing to said communication data symbols.

14. The method of claim 13, further comprising steps of:

determining a receive station GPS-based geographical location for said receive apparatus with a GPS receiver; and calculating said propagation delay time from said receive station GPS-based location and said a geographical location of said transmit apparatus.

15. The method of claim 11, further comprising steps of:

determining said GPS-based time at a transmit apparatus with a transmit station GPS receiver;

synchronizing said communication data symbols to said GPS-based time; and transmitting said communication signal from said transmit apparatus.

16. A method for transmitting a communication signal from a transmit apparatus, comprising steps of:

determining global positioning system (GPS) time clock with a transmit station GPS receiver;

synchronizing communication data symbols with said GPS-based time; and transmitting a communication signal having said communication data symbols.

17. A method for transmitting a communication signal from a transmit apparatus, comprising steps of:

determining global positioning system (GPS) time clock with a transmit station GPS receiver;

synchronizing a packet of said communication data symbols to said GPS-based time without use of a packet synchronization word; and transmitting a communication signal having said packet.

18. The method of claim 16, further comprising steps of:

providing a propagation advance time for a signal propagation time between the transmit apparatus and a receive apparatus for receiving said communication signal; and using said propagation advance time with said GPS-based time for synchronizing said communication data symbols.

19. The method of claim 18, further comprising steps of:

determining a transmit station GPS-based geographical location for the transmit apparatus; and calculating said propagation advance time from said transmit station GPS-based location and a geographical location of said receive apparatus.

20. The method of claim 16, further comprising steps of:

receiving said communication signal with a receive apparatus;

determining said GPS-based time with a receive station GPS receiver; and aligning to said communication data symbols with said GPS-based time.

21. The receive apparatus of claim 1, wherein:

the receive symbol timer synchronizes to said data symbols without use of data synchronization symbols.

22. The receive apparatus of claim 1, wherein:

the receive symbol timer determines a time alignment of said communication data symbols without use of modulation on said communication signal.

23. The receive apparatus of claim 2, further comprising:

a propagation delay calculator for providing a propagation delay time between the receive apparatus and a transmit apparatus, said transmit apparatus for transmitting said communication signal, and using said GPS-based time with said propagation delay time for synchronizing to said data frame.

24. The receive apparatus of claim 23, wherein:

the receive station GPS receiver is further for determining a receive station GPS-based geographical location for the receive apparatus; and the propagation delay calculator is further for calculating said propagation delay time from said receive station GPS-based location and a geographical location of said transmit apparatus.

25. The transmit apparatus of claim 7, wherein:

a propagation advance calculator for providing a propagation advance time between the transmit apparatus and a receive apparatus for receiving said communication signal and for using said GPS-based time with said propagation advance time for synchronizing to said data frame.

26. The transmit apparatus of claim 7, wherein:

a propagation advance calculator for providing a propagation advance time between the transmit apparatus and a receive apparatus for receiving said communication signal and for using said GPS-based time with said propagation advance time for synchronizing to said data frame.

27. The transmit apparatus of claim 26, wherein:

the transmit station GPS receiver is further for determining a transmit station GPS-based geographical location for the transmit apparatus; and the propagation advance calculator is further for calculating said propagation advance time from said transmit station GPS-based location and a geographical location of said receive apparatus.

28. The transmit apparatus of claim 7, wherein:

said communication signal is transmitted to a receive apparatus, said receive apparatus including a receive station GPS receiver for determining said GPS-based time and a receive frame timer for synchronizing said frame with said GPS-based time.

29. The method of claim 11, wherein:

said data symbols are synchronized without use of data synchronization symbols.

30. The method of claim 11, wherein:

said time alignment of said communication data symbols is determined without use of modulation on said communication signal.

31. The method of claim 12, further comprising steps of:

providing a signal propagation delay time between the receive apparatus and a transmit apparatus for transmitting said communication signal; and using said propagation delay time with said GPS-based time for synchronizing to said packets.

32. The method of claim 31, wherein:

determining a receive station GPS-based geographical location for said receive apparatus with a GPS receiver; and calculating said propagation delay time from said receive station GPS-based location and said a geographical location of said transmit apparatus.

33. The method of claim 17, wherein:

providing a propagation advance time for a signal propagation time between the transmit apparatus and a receive apparatus for receiving said communication signal; and using said propagation advance time with said GPS-based time for synchronizing said packet.

34. The method of claim 33, wherein:

determining a transmit station GPS-based geographical location for the transmit apparatus; and calculating said propagation advance time from said transmit station GPS-based location and a geographical location of said receive apparatus.

35. The method of claim 17, wherein:

receiving said communication signal with a receive apparatus;

determining said GPS-based time with a receive station GPS receiver; and aligning to said packet with said GPS-based time.

* * * * *